United States Patent [19]
Atkinson

[11] Patent Number: 5,701,424
[45] Date of Patent: Dec. 23, 1997

[54] PALLADIAN MENUS AND METHODS RELATING THERETO

[75] Inventor: Robert G. Atkinson, Woodinville, Wash.

[73] Assignee: Microsoft Corporation, Redmond, Wash.

[21] Appl. No.: 467,960

[22] Filed: Jun. 6, 1995

Related U.S. Application Data

[63] Continuation of Ser. No. 909,163, Jul. 6, 1992, abandoned.
[51] Int. Cl.$^6$ ...................................................... G06F 3/00
[52] U.S. Cl. ............................................................ 395/353
[58] Field of Search ...................................... 395/155–157, 395/159, 161, 353

[56] References Cited

U.S. PATENT DOCUMENTS 4,896,291   1/1990   Gest et al. ..................... 364/900 X

FOREIGN PATENT DOCUMENTS 0498082   12/1992   European Pat. Off. .

OTHER PUBLICATIONS

Research Disclosure #31541 (Kenneth Mason Publications Ltd., Jul. 1990), p. 561.
Abstract only of LaLonde et al., "Pie Menus", Journal of Object–Oriented Programming, vol. 2, No. 1 (May–Jun. 1989), pp. 47–55.

Hopkins, "The Design and Implementation of Pie Menus," Dr. Dobb's Journal pp. 16–27, Dec. 1991.

Perlman, "Making the Right Choices with Menus", Interact '84, pp. 317–321, 1985.

Card, "User Perceptual Mechanisms in the Search of Computer Command Menus," Human Factors in Computer Systems Proceedings, Mar. 1982, pp. 190–196.

Primary Examiner—Heather R. Herndon
Assistant Examiner—Joseph R. Burwell
Attorney, Agent, or Firm—Jones & Askew, LLP

[57] ABSTRACT

A computer system having a visual display which displays a Palladian menu is disclosed. The Palladian menu includes a circular portion and a rectangular portion. High-frequency commands may be placed as selectable command options within wedges of the circular portion of the Palladian menu, while the less frequent command options are placed in the rectangular portion of the menu. The Palladian menu is preferably a "pops up" menu, with the high-frequency commands specific and equal distance within the circular portion of the menu and located a specific and equal distance from the mouse pointer when the menu is initially selected.

28 Claims, 1 Drawing Sheet

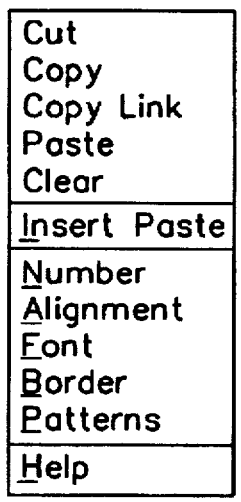
Figure 1
(Prior Art)
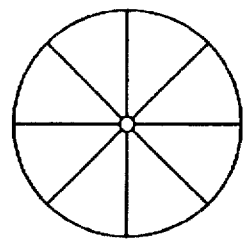
Figure 2
(Prior Art)
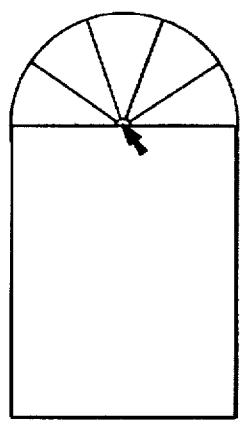 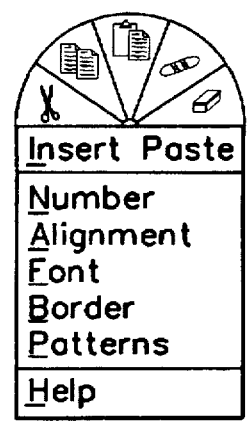
Figure 3(a)   Figure 3(b)
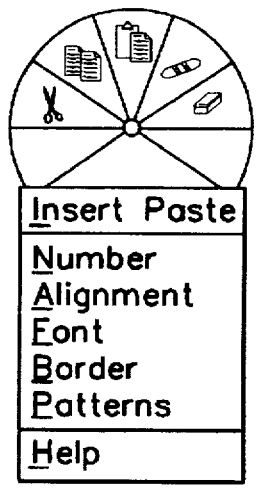
Figure 4
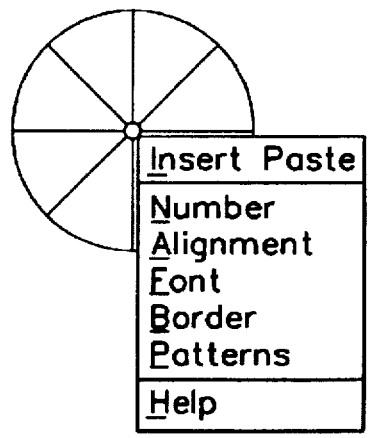
Figure 5

PALLADIAN MENUS AND METHODS RELATING THERETO

CROSS-REFERENCE TO RELATED APPLICATION

This application is a continuation of U.S. patent application Ser. No. 07/909,163 filed Jul. 6, 1992, now abandoned.

TECHNICAL FIELD

This invention is generally directed to a user interface for a computer system, and more specifically, to a menu displayed on a video screen and controlled by a computer system.

BACKGROUND OF THE INVENTION

A computer system displays information to the user by a visual display. Over the years, the human-computer interface has undergone a number of improvements, including menu-based command systems where a user selects a command from a set of choices displayed on the visual display. Such menu-based command systems are especially attractive for new or untrained users, since the user need not recall the specific command, but merely recognize it from a list of options. The standard pull-down or drop-down menu presents the user with user-selectable options. In some instances, computer systems create hierarchies of menus leading to sub-menus to avoid excessively large menus or inappropriate menu choices. As illustrated in FIG. 1, a prior art one-dimensional list of menu options is illustrated which contains the following twelve commands: "Cut", "Copy", "Copy Link", "Paste", "Clear", "Insert Paste", "Number", "Alignment", "Font", "Border", "Patterns" and "Help". If the user wishes to select a menu item located near the bottom of the list, such as "Patterns", the user must move the pointing device a relatively large distance down the list in order to make this selection. This results in a time-consuming and less efficient user interface.

One attempt to avoid a long horizontal list of menu options has resulted in the so-called "pop-up pie menu" (See Hopkins, "The Design and Implementation of Pie Menus," *Dr. Dobb's Journal*, December 1991, pp. 16–26). FIG. 2 illustrates a prior art pie menu containing 8 menu options, with each option located within a "wedge" of the pie. A serious disadvantage of a pie menu is the limited number of commands it can contain. In practice, a pie menu is limited to 8 or 10 menu options, since more options would make the wedges too thin for easy user selection. Furthermore, tests have demonstrated that it is more difficult to flick downwards with the mouse than it is to flick upwards, making the commands on the bottom half of the pie less accessible than those on the top.

Accordingly, there is a need in the art for menus which allow the user to select various options, but do not require excessive mouse movement to make the selection. The present invention fulfills this need and provides other related advantages.

SUMMARY OF THE INVENTION

It is an object of the present invention to provide a user interface for a computer system which permits the user to select various command options from a menu with minimal movement of the pointing device.

The present invention discloses a user interface for a computer system which employs a visual display of a "Palladian" menu. A Palladian menu is a menu which includes a rectangular portion and a circular portion. Both the circular portion and the rectangular portion of the menu contains selectable command areas. When a user selects a command area within the circular or rectangular portions of the Palladian menu, the selected command is activated and the computer performs the corresponding function.

In one embodiment, the Palladian menu includes an upper circular portion and a lower rectangular portion. The upper circular portion contains selectable command options within wedges of the circular portion, and the lower rectangular portion contains a horizontal listing of selectable command options. In a preferred embodiment, the upper-circular portion is a half-circle having a diameter equal to the width of the lower rectangular portion.

In a further embodiment, the Palladian menu of the present invention is a pop-up menu, in that it only appears on the visual display of the computer device when activated by the user.

BRIEF DESCRIPTION OF THE DRAWINGS

FIG. 1 illustrates a prior art rectangular menu box having a horizontal listing of selectable command options.

FIG. 2 illustrates a prior art pie menu having user selectable command options within wedges of the pie.

FIGS. 3(a) and 3(b) illustrate a preferred embodiment of the Palladian menu of the present invention.

FIGS. 4 and 5 illustrate alternative embodiments of the present invention.

DETAILED DESCRIPTION OF THE INVENTION

The present invention discloses a computer-controlled menu visual display on a computer system having a display device for displaying the menu and a memory medium having instructions. The menu is a Palladian menu, having a rectangular portion and a circular portion. When selected or "popped up," the menu is preferably centered underneath the mouse position as illustrated in FIG. 3(a). This places all the commands within the circular portion of the menu a fixed and equal distance from the mouse pointer. Gestural muscle memory can be used by the user to choose commands, resulting in a more time-efficient use of the menu, and less cognitive destruction in the user's thought process.

The Palladian menu of FIG. 3(a) includes a half-pie menu (i.e., the circular portion) on top of a rectangular menu, with the circular portion containing five selectable command options within the individual wedges of the half-pie. Although the wedges are depicted in the half-pie portion of the Palladian menu in FIGS. 3(a) and 3(b), the number of wedges may generally vary from 1–5 for this portion of the menu. The center area of the circular portion of the Palladian menu is preferably a "dead zone" where the mouse pointer originally appears when the menu is selected and contains no selectable command option.

In an alternative embodiment, a three-quarter pie menu may be placed on top of a rectangular menu as illustrated in FIG. 4. The three-quarter pie adds the west/southwest and east/southeast wedge sectors and shifts the horizontal menu down to accommodate the added wedges (giving 7 or 8 accessible wedges instead of 5). In yet a further alternative embodiment, as illustrated in FIG. 5, a three-quarter pie menu is used in combination with a rectangular menu, with the upper left-hand corner of the rectangular menu located near the center of the pie menu.

High-frequency universal commands may be placed in the wedges of the circular portion of the menu, with the remaining, less-universal and context-specific commands placed in the rectangular menu box. The Palladian menu of the present invention has many of the advantages of menu pies, but without the limitations as to the number of commands they can accommodate. Moreover, the high-frequency universal commands are always in exactly the same place for the user. For example, when the commands "Cut", "Copy", "Paste", "Link" and "Clear" are high-frequency commands, they may be placed in the circular portion of the Palladian menu as illustrated in FIG. 3(b). Users come to use these selectors almost as a matter of reflex. In addition, this gestural behavior can be easily discovered and incrementally practiced and learned, in contrast to, for example, other menu systems which must be taught and remembered.

In addition, the selectable commands within the circular portion of the menu may be represented by icons which are considerably more vertically compact than the equivalent normal menu item. For example, the prior art rectangular menu box of FIG. 1 illustrates what FIG. 3(b) would look like if arranged in a purely rectangular form.

The Palladian menu of the present invention is not limited to the use of a pointing device, and a keyboard interface may be employed. For example, immediately after the Palladian menu is selected, the "up" arrow on the keyboard may allow the user to enter the circular portion of the menu, and the "left" and "right" arrows may allow the user to go clockwise and counterclockwise around the pie. The "down" arrow on the keyboard would then permit the user to select commands within the rectangular portion of the menu.

In a further embodiment, a pie wedge within the circular portion of the Palladian menu may have a sub-menu, just like normal rectangular menu items can have a sub-menu. In addition, both the angle and the distance travelled by the mouse from the center of the Palladian menu may provide information to the computer. For example, a Palladian menu for choosing a font and point size may employ a different font selection within each pie wedge, and the distance from the center would indicate the point size.

In yet a further embodiment, the circular portion of the menu may have items arranged in a spiral, but only display a fixed number of items at any particular time. By winding the cursor around the menu center, the user may walk up or down the spiral to display new items.

While this invention has been shown and described with reference to preferred embodiments, it will be understood by those skilled in the art that various changes or modifications in form and detail may be made without departing from the spirit and scope of this invention.

I claim:

1. A method in a computer system for displaying a Palladian menu on a display device, the method comprising the computer implemented steps of:

storing in a computer memory a plurality of user commands for controlling the computer system;

generating from the stored commands the Palladian menu:

displaying on a portion of the display device a radial portion of the Palladian menu having a center and containing selectable commands located radially from the center of the radial portion; and displaying a rectangular portion of the Palladian menu overlapping the radial portion and containing a listing of selectable commands.

2. The method of claim 1 wherein the radial portion is a half-circular portion.

3. The method of claim 1 wherein the radial portion is a three-quarter pie menu.

4. The method of claim 1 wherein at least one of the selectable commands contained in the radial portion is represented by an icon.

5. The method of claim 1, further comprising the step if, in response to selection of a selectable command contained in the radial portion, causing a submenu to appear.

6. The method of claim 1 wherein the selected commands are arranged in a spiral.

7. A method in a computer system for displaying a Palladian menu on a display device, the method comprising the computer implemented steps of:

storing in a computer memory a plurality of user commands for controlling the computer system;

generating from the stored commands the Palladian menu;

displaying on a portion of the display device an upper radial portion of the Palladian menu, the upper radial portion containing selectable commands within wedge-shaped selectable areas located radially from the center of the radial portion; and displaying a lower rectangular portion of the Palladian menu overlapping the upper radial portion, the lower rectangular portion containing a horizontal listing of selectable commands.

8. The method of claim 7 wherein the upper radial portion is a half-circular portion.

9. A method in a computer system for selecting commands that are displayed on a display device within a Palladian menu having a radial portion and an overlapping rectangular portion, wherein the radial portion of the Palladian menu has a center and contains selectable commands located radially from the center, and wherein the rectangular portion of the Palladian menu contains a listing of selectable commands, the method comprising the computer implemented steps of:

receiving a user indication of a gesture using an input device of the computer system; and in response to receiving the user indication of the gesture, selecting one of either a command of the radial portion or a command of the rectangular portion; and performing a function corresponding to the selected command.

10. A method in a computer system for receiving and responding to instructions from a user, the method comprising the computer implemented steps of:

displaying on a portion of a display device a Palladian menu having a radial portion with a center and containing selectable commands located radially from the center, and having a rectangular portion containing selectable commands, each selectable command having a corresponding function, the rectangular portion overlapping the radial portion;

receiving an indication from an input device of a selection of one of the selectable commands; and in response to the received indication, performing the function corresponding to the indicated selection.

11. The method of claim 10 wherein the radial portion is a half-circular portion.

12. The method of claim 10 wherein the radial portion is a three-quarter pie menu.

13. The method of claim 10 wherein at least one of the selectable commands contained in the radial portion is represented by an icon.

14. The method of claim 10 wherein at least one of the selectable commands contained in the radial portion, when selected, causes a submenu to appear.

15. The method of claim 10 wherein the selected commands are arranged in a spiral.

16. The method of claim 10 wherein the step of receiving the indication of the selection receives an indication of a keystroke.

17. The method of claim 10 wherein the step of receiving the indication of the selection receives a mouse event.

18. A computer readable memory medium containing instructions for controlling a computer system to display a menu on a display device by performing the steps of:
- storing in the computer readable memory a plurality of user options for controlling the computer system;
- generating the menu from the stored options;
- displaying on a portion of the display device a radial portion of the menu having a center and containing selectable options located radially from the center of the radial portion; and
- displaying a rectangular portion of the menu overlapping the radial portion and containing a list of selectable options.

19. A computer readable memory medium containing instructions for controlling a computer system to display a menu on a display device by performing the steps of:
- storing in the computer readable memory a plurality of user options for controlling the computer system;
- generating the menu from the stored options;
- displaying on a portion of the display device an upper radial portion of the menu, the upper radial portion containing selectable options within wedge-shaped areas located radially from the center of the radial portion; and
- displaying a lower rectangular portion of the menu overlapping the upper radial portion, the lower rectangular portion containing a horizontal list of selectable options.

20. A computer readable memory medium containing instructions for controlling a computer system to receive and respond to user instructions by performing the steps of:
- displaying on a portion of a display device a menu having a radial portion with a center and containing selectable commands located radially from the center, and having a rectangular portion containing selectable commands, each selectable command having a corresponding function, the rectangular portion overlapping the radial portion;
- receiving an indication from an input device of a selection of one of the selectable commands; and
- in response to the received indication, performing the function corresponding to the indicated selection.

21. The computer readable memory medium of claim 20 wherein the radial portion is a half-circular portion.

22. The computer readable memory medium of claim 20 wherein the radial portion is a three-quarter pie menu.

23. The computer readable memory medium of claim 20 wherein at least one of the selectable commands contained in the radial portion is represented by an icon.

24. The computer readable memory medium of claim 20 containing instructions for controlling a computer processor to further perform the step of, in response to a section of a selectable command contained in the radial portion, causing a submenu to appear.

25. The computer readable memory medium of claim 20 wherein the step of receiving the indication of the selection receives an indication of a keystroke.

26. The computer readable memory medium of claim 20 wherein the step of receiving the indication of the selection receives a mouse event.

27. A computer system for receiving and responding to instructions from a user comprising:
- a display device;
- a Palladian menu having a radial portion with a center and containing selectable commands located radially from the center, and having a rectangular portion containing selectable commands, each selectable command having a corresponding function, the rectangular portion overlapping the radial portion;
- a display mechanism that, upon invocation, displays on a portion of the display device the Palladian menu; and
- an execution mechanism that
  - invokes the display mechanism;
  - receives an indication from an input device of a selection of one of the selectable commands of the displayed Palladian menu; and
  - in response to the received indication, performs the function corresponding to the indicated selection.

28. A computer system for displaying a Palladian menu comprising:
- a display device;
- a computer memory that stores a plurality of user commands for controlling the computer system;
- a menu generation mechanism that upon invocation generates a Palladian menu from the stored commands;
- a display mechanism that, in response to invocation,
  - invokes the menu generation mechanism;
  - displays on a portion of the display device a radial portion of the Palladian menu having a center and containing selectable commands located radially from the center of the radial portion; and
  - displays a rectangular portion of the Palladian menu overlapping the radial portion and containing a listing of selectable commands; and
- a user invocation mechanism that invokes the display mechanism to display the Palladian menu.

* * * * *